US012649136B2

(12) United States Patent
Zugic et al.

(10) Patent No.: US 12,649,136 B2
(45) Date of Patent: Jun. 9, 2026

(54) SYSTEM AND METHOD FOR OPERATING A ELECTRIFIED REACTOR

(71) Applicant: Lydian Labs, Inc., Cambridge, MA (US)

(72) Inventors: Branko Zugic, Cambridge, MA (US); Joseph Rodden, Cambridge, MA (US)

(73) Assignee: Lydian Labs, Inc., Cambridge, MA (US)

( * ) Notice: Subject to any disclaimer, the term of this patent is extended or adjusted under 35 U.S.C. 154(b) by 0 days.

(21) Appl. No.: 19/299,173

(22) Filed: Aug. 13, 2025

(65) Prior Publication Data

US 2026/0048377 A1      Feb. 19, 2026

Related U.S. Application Data

(60) Provisional application No. 63/682,474, filed on Aug. 13, 2024.

(51) Int. Cl.
*B01J 19/00*          (2006.01)
*B01J 19/24*          (2006.01)
(Continued)

(52) U.S. Cl.
CPC ........... *B01J 19/0013* (2013.01); *B01J 19/24* (2013.01); *B01J 27/224* (2013.01); *C01B 32/40* (2017.08);
(Continued)

(58) Field of Classification Search
None
See application file for complete search history.

(56) References Cited

U.S. PATENT DOCUMENTS

| | | | |
|---|---|---|---|
| 3,477,827 | A | 11/1969 | Mott |
| 3,541,729 | A | 11/1970 | Dantowitz |

(Continued)

FOREIGN PATENT DOCUMENTS

| | | |
|---|---|---|
| CN | 1514508 A | 7/2004 |
| CN | 105183039 A | 12/2015 |

(Continued)

OTHER PUBLICATIONS

Mooraj, et al., "3D printing of metal-based materials for renewable energy applications", Nano Research, Tsinghua University Press, CN, vol. 14, No. 7, Dec. 4, 2020 (Dec. 4, 2020), pp. 2105-2132, XP037499819, ISSN: 1998-0124, DOI: 10.1007/S12274-020-3230-X [retrieved on Dec. 4, 2020].

(Continued)

*Primary Examiner* — Joseph D Anthony
(74) *Attorney, Agent, or Firm* — Jeffrey Schox; Randy Mehlenbacher

(57)          ABSTRACT

The method can include receiving a baseline signal curve, operating an electrified reactor, measuring a signal, optionally determining a state (e.g., state of health) of the electrified reactor, and controlling the electrified reactor based on the signal. The method can include receiving (e.g., determining, measuring, etc.) a resistance-temperature and/or resistance-time curve; operating an electrified reactor comprising resistively heating a porous catalytic element; measuring an electrical signal (e.g., resistance, current, voltage, etc.) of the electrified reactor; optionally inferring a temperature of the electrified reactor based on the electrical signal and the resistance-temperature, and controlling the electrified reactor based on the electrical signal. The system can include one or more of a reaction module (e.g., an electrical coupler or electrode and catalytic element, etc.), inlet and outlet valves, power source, electrical feedthroughs (Continued)

(e.g., leads, supports, etc.), sensors, and computing system (e.g. controller).

10 Claims, 10 Drawing Sheets

(51) Int. Cl.
    *B01J 27/224*     (2006.01)
    *C01B 32/40*     (2017.01)

(52) U.S. Cl.
    CPC ................. *B01J 2219/00058* (2013.01); *B01J 2219/00135* (2013.01); *B01J 2219/00195* (2013.01); *B01J 2219/0022* (2013.01); *B01J 2219/00234* (2013.01); *B01J 2219/00268* (2013.01)

(56) References Cited

U.S. PATENT DOCUMENTS

| | | | |
|---|---|---|---|
| 5,428,955 | A | 7/1995 | Yuuki et al. |
| 7,172,735 | B1 | 2/2007 | Lowe et al. |
| 7,297,324 | B2 * | 11/2007 | TeGrotenhuis ......... C01B 3/384 |
| | | | 423/655 |
| 7,611,579 | B2 | 11/2009 | Lashmore et al. |
| 8,926,721 | B2 | 1/2015 | Bingue et al. |
| 11,173,545 | B2 | 11/2021 | Qi et al. |
| 11,866,328 | B1 | 1/2024 | Sheludko et al. |
| 12,157,104 | B2 | 12/2024 | Zugic |
| 2006/0014056 | A1 | 1/2006 | Park et al. |
| 2006/0124445 | A1 | 6/2006 | Labrecque et al. |
| 2015/0129805 | A1 * | 5/2015 | Karpenko ................ B01J 8/008 |
| | | | 252/373 |
| 2017/0283259 | A1 * | 10/2017 | Yu ............................ B01J 35/45 |
| 2019/0118264 | A1 | 4/2019 | Qi et al. |
| 2020/0354216 | A1 | 11/2020 | Mortensen |
| 2021/0113983 | A1 | 4/2021 | Mortensen et al. |
| 2021/0238035 | A1 | 8/2021 | Mortensen et al. |
| 2021/0262662 | A1 | 8/2021 | Maeshima et al. |
| 2021/0318177 | A1 | 10/2021 | Culbertson et al. |
| 2022/0081291 | A1 * | 3/2022 | Mortensen .............. C01B 3/382 |
| 2022/0306559 | A1 | 9/2022 | Mortensen et al. |
| 2022/0410109 | A1 * | 12/2022 | Mortensen ............. B01J 8/0214 |
| 2023/0002690 | A1 | 1/2023 | Klaassen et al. |
| 2023/0118083 | A1 | 4/2023 | Jo et al. |
| 2023/0159326 | A1 | 5/2023 | Surma et al. |
| 2024/0059562 | A1 * | 2/2024 | Mortensen .............. C01B 3/384 |
| 2025/0001381 | A1 | 1/2025 | Zugic et al. |
| 2025/0243071 | A1 | 7/2025 | Zugic et al. |

FOREIGN PATENT DOCUMENTS

| | | |
|---|---|---|
| CN | 115888618 A | 4/2023 |
| EP | 3574991 A1 | 12/2019 |
| GB | 1547810 A | 6/1979 |
| JP | 2005087803 A | 4/2005 |
| JP | 2006012790 A | 1/2006 |
| JP | 2009513327 A | 4/2009 |
| WO | 2004091773 A1 | 10/2004 |
| WO | 2019228797 A1 | 12/2019 |
| WO | 2020185744 A1 | 9/2020 |
| WO | 2021110809 A1 | 6/2021 |
| WO | 2022221740 A1 | 10/2022 |
| WO | 2022241260 A1 | 11/2022 |
| WO | 2024086300 A1 | 4/2024 |

OTHER PUBLICATIONS

Abbas, et al., "Experimental assessment of reverse water gas shift integrated with chemical looping for low-carbon fuels", Journal of CO2 Utilization 83 (2024) 102775.

Cao, et al., "CO2 conversion to syngas via electrification of endo-thermal reactors: process design and environmental impact analysis", Energy Conversion and Management, vol. 265, Aug. 1, 2022, 115763.

Chen, et al., "Recent Advances in Supported Metal Catalysts and Oxide Catalysts for the Reverse Water-Gas Shift Reaction", Frontiers in Chemistry, Aug. 2020, vol. 8, Article 709.

González-Castaño, et al., "The reverse water gas shift reaction: a process systems engineering perspective", The Royal Society of Chemistry 2021, React. Chem. Eng., DOI: 10.1039/d0re00478b.

Idamakanti, et al., "Electrified Catalysts for Endothermic Chemical Processes: Materials Needs, Advances, and Challenges", ACS Eng. Au 2024, 4, 71-90.

Ishida, et al., "CO2 Recovery in a Power Plant With Chemical Looping Combustion", Energy Convers. Mgmt., vol. 38, Suppl., pp. S187 SI92, 1997.

Maporti, et al., "Towards sustainable hydrogen production: Integrating electrified and convective steam reformer with carbon capture and storage", Chemical Engineering Journal 499 (2024) 156357.

Subramanian, et al., "Geometric Catalyst Utilization in Zero-Gap CO2 Electrolyzers", ACS Energy Letters. vol 8. No. 1. Article. Jan. 2023. DOI: https://doi.org/10.1021/acsenergylett.2c02194.

Theofanidis, et al., "On the Electrification of CO2-Based Methanol Synthesis via a Reverse Water-Gas Shift: A Comparative Techno-Economic Assessment of Thermo-Catalytic and Plasma-Assisted Routes", Ind. Eng. Chem. Res. 2024,63,12035-12052.

Trivino, et al., "Transforming CO2 to valuable feedstocks: Emerging catalytic and 2 technological advances for the reverse water gas shift reaction", Chemical Engineering Journal, vol. 487, May 1, 2024, 150369.

Wismann, et al., "Electrified methane reforming: A compact approach to greener industrial hydrogen production", Science 364, 756-759 (2019) May 24, 2019.

Zhang, Xiao, "A stable low-temperature H2-production catalyst by crowding Pt on α-MoC", Nature, Article, vol. 589—Jan. 21, 2021, https://doi.org/10.1038/s41586-020-03130-6.

Zugic, et al., "Reactor Systems for Endothermic Reactions", U.S. Appl. No. 19/038,495, filed Jan. 27, 2025.

* cited by examiner 200
(electrical power conductors)

300

120

160

140

160

120

300

SYSTEM AND METHOD FOR OPERATING A ELECTRIFIED REACTOR

CROSS-REFERENCE TO RELATED APPLICATIONS

This application claims the benefit of U.S. Provisional Application No. 63/682,474 filed 13 Aug. 2024, which is incorporated in its entirety by this reference.

TECHNICAL FIELD

This invention relates generally to the chemical processing field, and more specifically to a new and useful system and method for operating a thermal reactor in the chemical processing field.

BACKGROUND OF THE INVENTION

Traditional reactor systems are heated via the combustion of carbonaceous feedstocks. System control can depend on the transfer of heat from the combustion chamber to the internal gas/catalyst environment. This requires heat transfer through the reactor wall and catalyst pellets (metal-oxide-supported), generating a parabolic temperature profile. Typical process control parameters for this system include inlet and outlet gas temperature, inlet and outlet gas composition, temperature readings from the reactor system (sensors may be placed in the combustion chamber, at the reactor wall, or inside the reactor), temperature readings from the combustion furnace. The process control system is used to determine the necessary supply of fuel and oxidant to the combustion chamber. Because the combustion chamber usually heats many components simultaneously (such as an array of tubes in the case of steam methane reforming), the combustion chamber temperature is often averaged over zones that heat multiple reactor tubes or sections of a single reactor. This results in relatively large variations in catalyst temperature (both axially and radially in a catalyst tube) and large resistance to heat transfer, yielding limited single-pass reactant conversion and low single-pass reactor efficiency.

DETAILED DESCRIPTION OF THE INVENTION

The following description of the embodiments of the invention is not intended to limit the invention to these embodiments, but rather to enable any person skilled in the art to make and use this invention.

1. Overview

Figure 1:
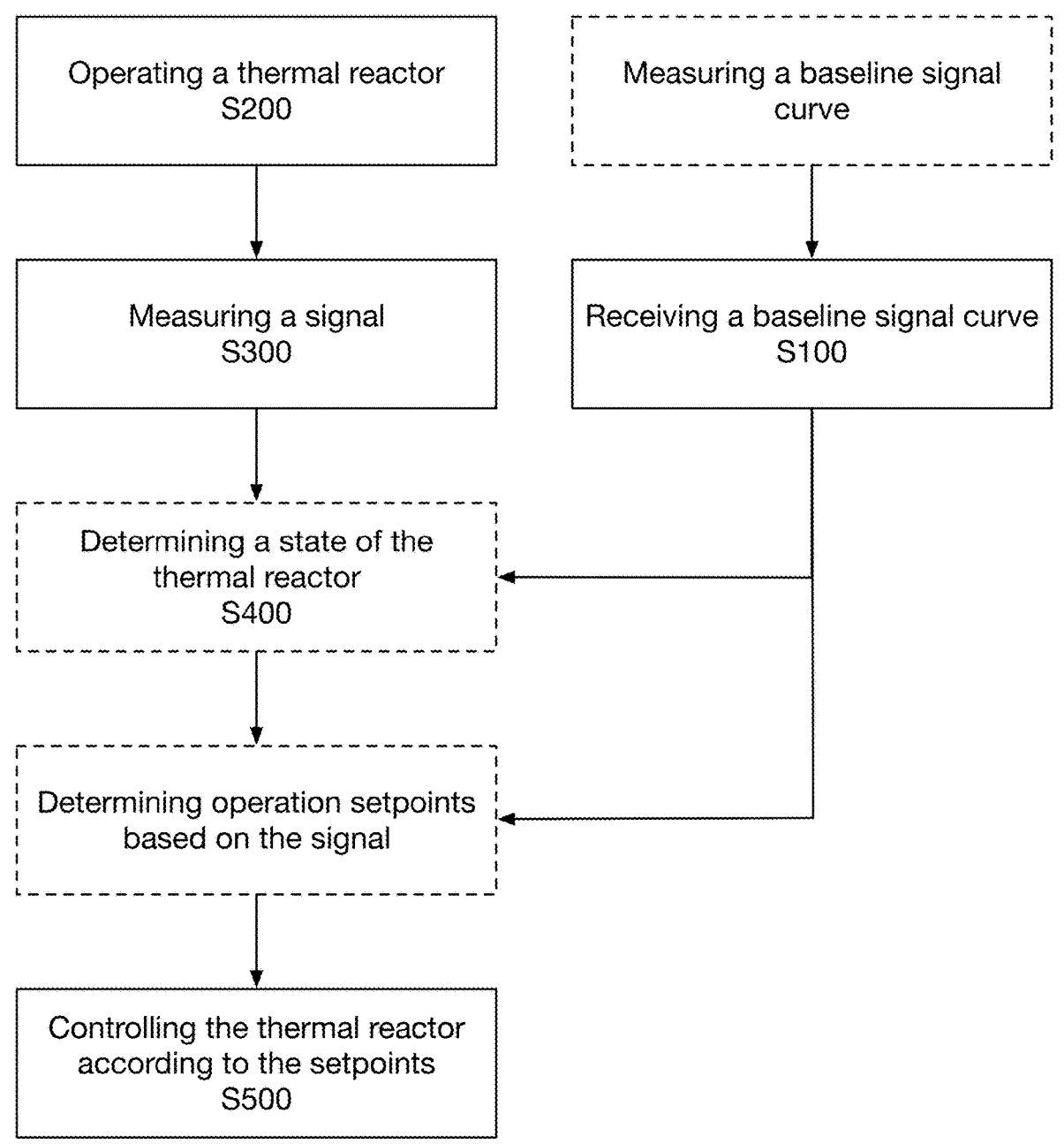
FIG. 1 is a schematic representation of a variant of the method.

As shown in FIG. 1, the method can include receiving a baseline signal curve, operating a thermal reactor, measuring a signal, optionally determining a state (e.g., state of health) of the thermal reactor, and controlling the thermal reactor based on the signal. In an illustrative example, the method can include receiving a resistance-temperature and/or resistance-time curve; operating a thermal reactor by resistively heating a porous catalytic element (e.g., via Joule heating by passing an electric current therethrough, via inductive heating, etc.); measuring an electrical signal (e.g., resistance, current, voltage, etc.) of the thermal reactor; optionally inferring (e.g., calculating, determining, estimating, etc.) a temperature of the thermal reactor based on the electrical signal and the resistance-temperature; and controlling (or generating recommended operating instructions for) the thermal reactor based on the electrical signal. The method can optionally include determining a state of health and/or degradation level of the thermal reactor and/or components thereof (e.g., catalytic region, reaction module, power supply, etc.) based on the electrical signal and the resistance-time and/or resistance temperature curve). The method can optionally include measuring the baseline signal curves (e.g. resistance-temperature curve, resistance-time curve, etc.). In a specific variant, the method can exclude measuring temperature and use the electrical signal as a proxy for temperature when operating the thermal reactor.

Figure 2:
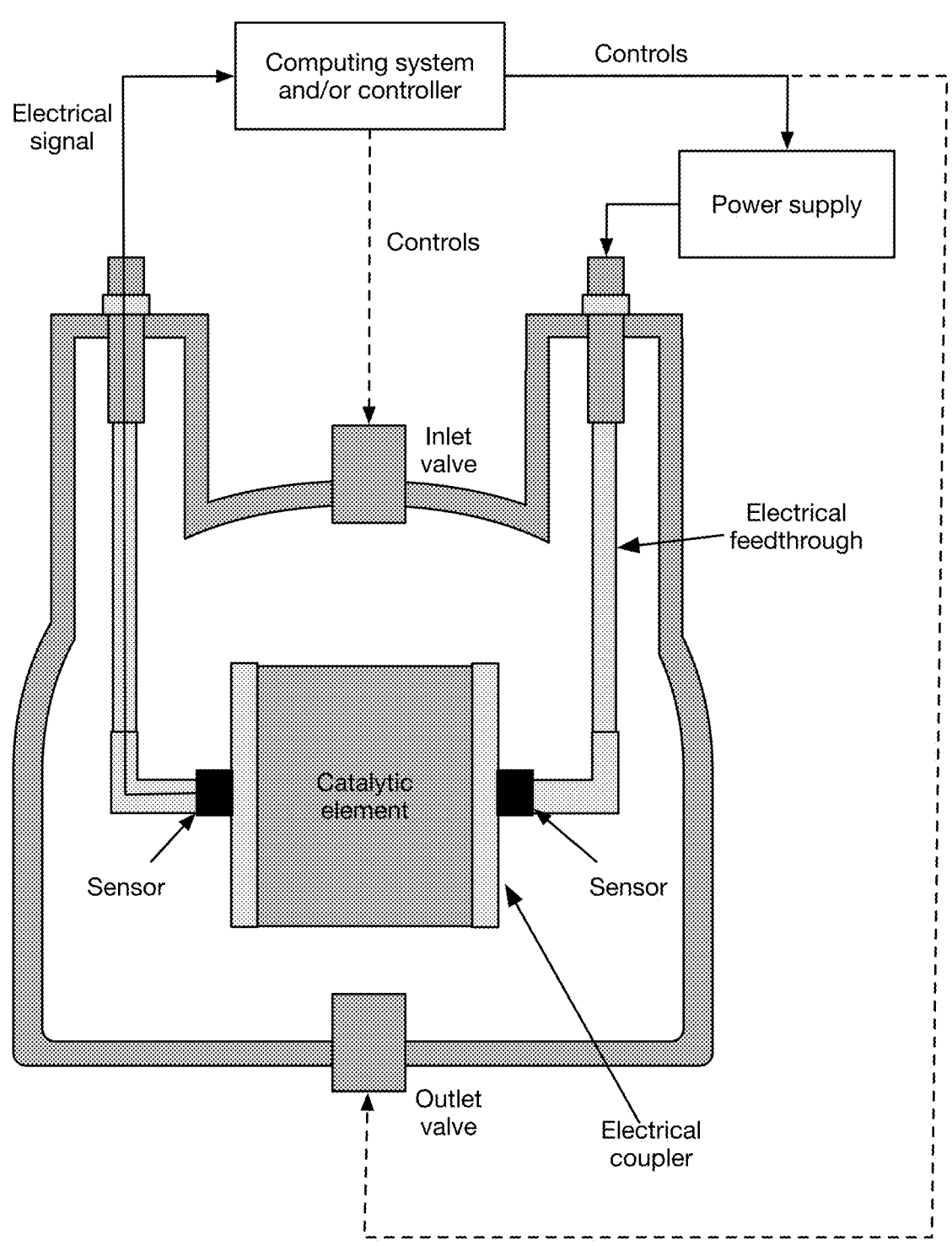
FIG. 2 is a schematic representation of a variant of the system.

As shown in FIG. 2, the system can include one or more of a reaction module (e.g., an electrical coupler or electrode in electrical communication with a catalytic element, etc.), inlet and outlet valves, power source, electrical feedthroughs (e.g., leads, supports, etc.), sensors, and computing system (e.g. controller). In an illustrative example, the system can include one or more solid electrical couplers, a porous catalytic element, a power source configured to resistively heat the catalytic element (e.g., by passing an electrical current through the catalytic element), sensors (e.g., electrical signal sensors), a computing system (e.g., configured to process signals from the sensors, determine operation setpoints, etc.), and a controller (e.g., configured to control the power source).

However, the system/method can be otherwise performed.

2. Technical Advantages

Variants of the technology can confer one or more advantages over conventional technologies.

First, variants of the process control scheme described here is based on high surface area heating elements that are catalytically active via the incorporation of catalyst materials into the structure. In variants, the high surface area catalytic element (e.g. porous, foam, etc.) can be resistively heated, resulting in an electrically-driven reactor system which is more environmentally sustainable than combustion-based methods (e.g., by leveraging environmentally friendly sources of electricity such as wind, solar, geothermal, nuclear, tidal, etc.). Heat can be generated at the catalyst by supplying an electrical current (i.e. power) to the high surface area element, thus providing the energy required to heat incoming gas and drive a thermochemical process. The temperature profile of a given cell in a multicell system (e.g., multicell thermal reactor) can be dependent on the series resistance of the components that the current is flowing through. In a typical reaction cell, the high temperature element will be the highest resistance component and will make up at least 50% of the total series resistance of the circuit.

Figure 6:
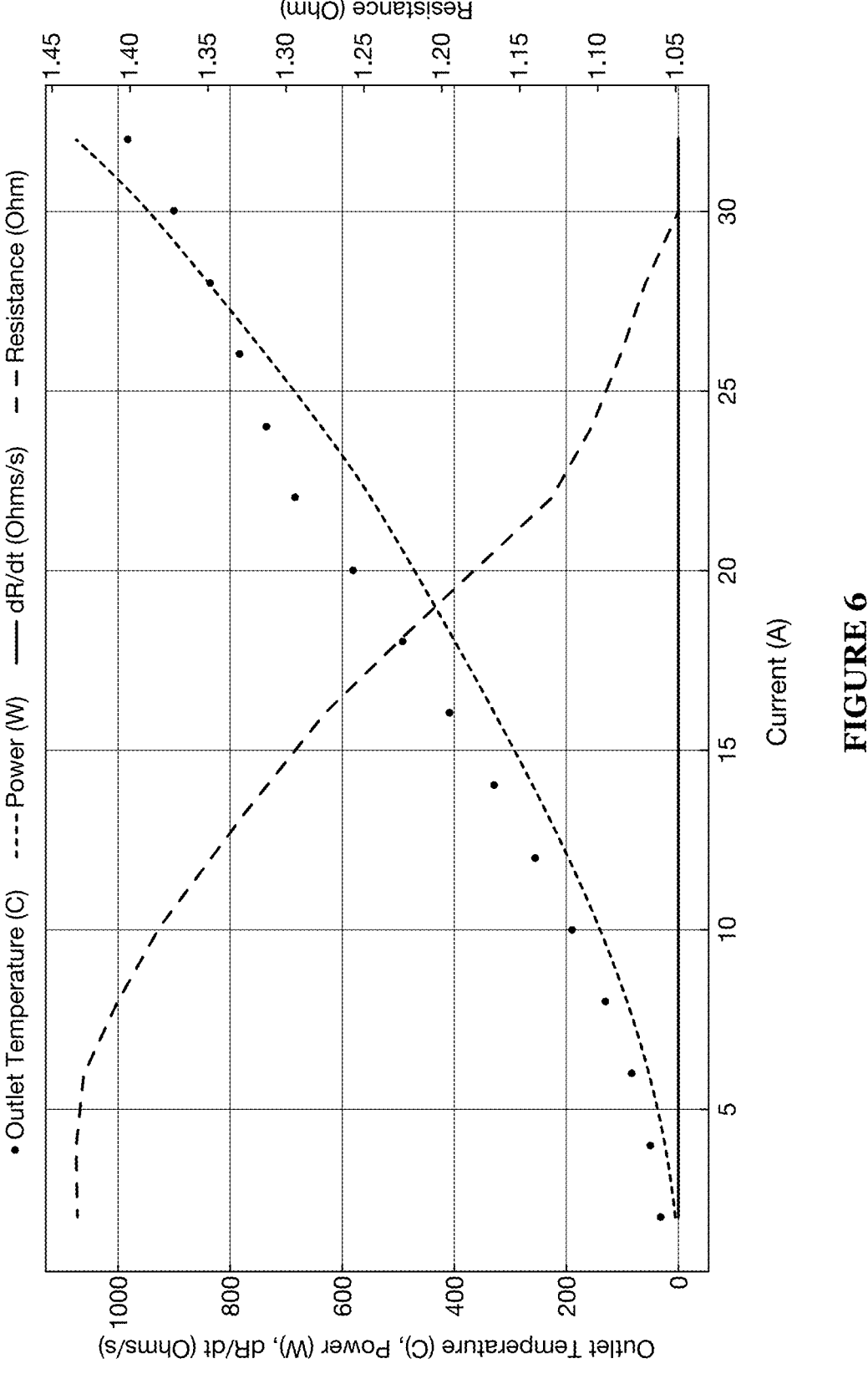
FIG. 6 shows an example of data for outlet temperature, resistance, and dR/dt at different current inputs.
Figure 8:
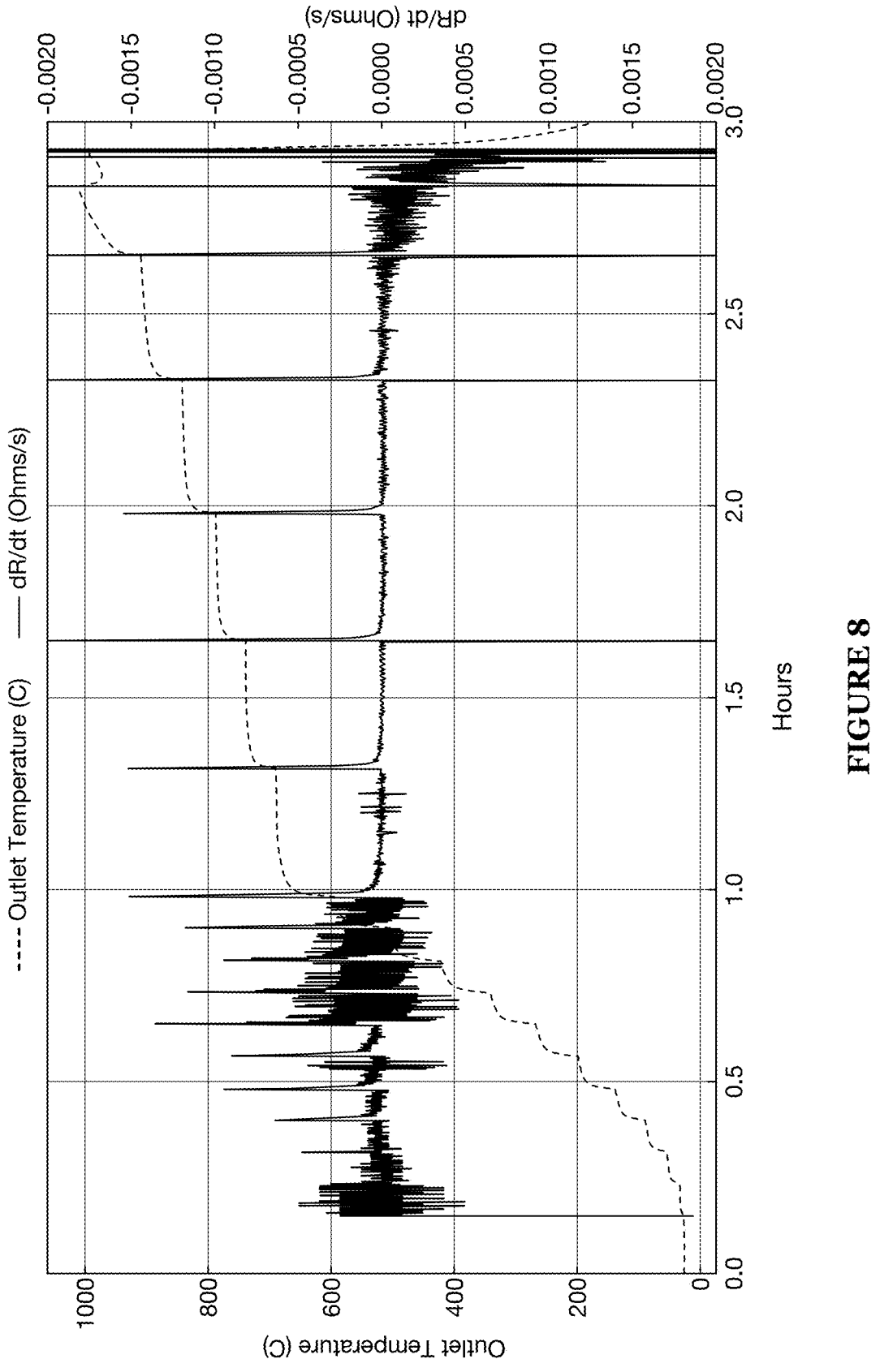
FIG. 8 shows an example of data for outlet gas temperature, and the derivative of the resistance measurement (dR/dt) observed under reverse water-gas shift conditions.

Second, variants of the technology leverage resistance signals for precise control. The resistance of the components can depend on the system temperature (e.g. metallic components will typically have a positive temperature coefficient while ceramics will typically have a negative temperature coefficient). The inventors have discovered that, when calibrated against known temperatures, the resistance at a given power (i.e. current and voltage) setting can be used to deduce the temperature of the cell. As the resistance tends to stabilize more quickly than the temperature, resistance can be a better parameter for precise process control. The resistance can respond to input changes very quickly (e.g., within 5 minutes) while the temperature can lag significantly and, in some cases, never reaches steady state (e.g., even after 20 minutes the temperature may not stabilize). This is shown for example in FIG. 8 which shows the derivative of the resistance vs time at varying current inputs and temperatures. Except for a brief excursion when each new setpoint is initiated, the dR/dt value remains largely at 0, indicating that the resistance stabilizes very quickly at each new setpoint. In variants, controlling the thermal reactor based on resistance signals allows for more precise and more responsive control. Response time can be critical in reactor systems—the most immediate feedback signal for control or general system response is typically the resistance of the cell. This can be observed for instance in FIG. 6.

Third, variants of the technology can enable determination of degradation or a state of health of the thermal reactor. For example, changes in the overall steady-state resistance of the circuit (typically an increase) can then be indicative of a degradation of a component. The degradation may occur anywhere in the system. The temperature of the incoming gas, the heat capacity of the gases, and the extent of reaction can all have a significant influence on the local temperature and resistance measurement, such that the resistance value can include rich information about the state of the system. When practical, components may be outfitted with high impedance voltage sense lines to measure the change in the resistivity of the component directly. Alternatively, using electrical characterization techniques such as electrochemical impedance spectroscopy can identify the location of the resistance change in the circuit in more detail. These techniques may show the reflection or transmission of an RF signal through the discontinuities (e.g. components) in the system. Relative changes in signals may be used to identify the cause of the overall/bulk resistance change. When a component or a bond between two components within the system degrades—that is the local resistance in the component or the bond increases—the temperature profile of the system will change accordingly. In this fashion, the resistance of the cell and its components can be used as a measure of the state of health of the system. It can also be used to estimate the overall efficiency of the system by calculating the expected Ohmic losses in the circuit outside of the reaction cell(s).

However, further advantages can be provided by the system and method disclosed herein.

3. Method

Figure 4:
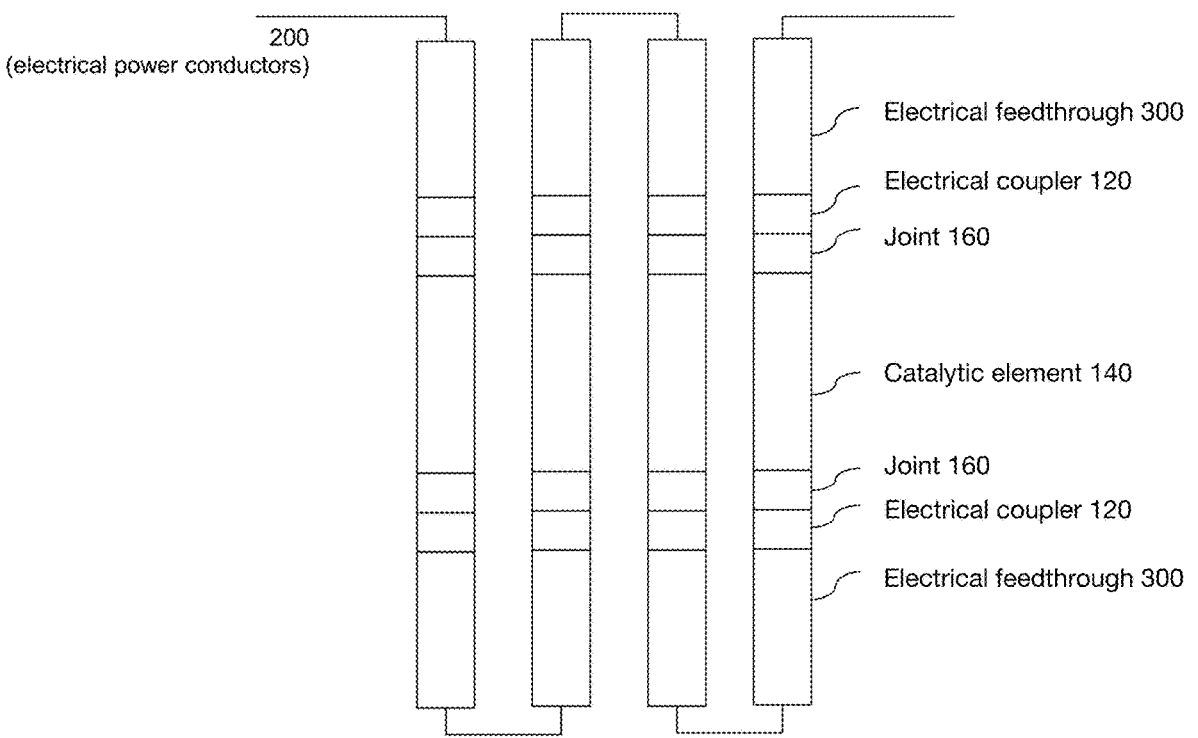
FIG. 4 is a schematic representation of a variant of a multicell reactor, where the reactor cells are in series
Figure 5:
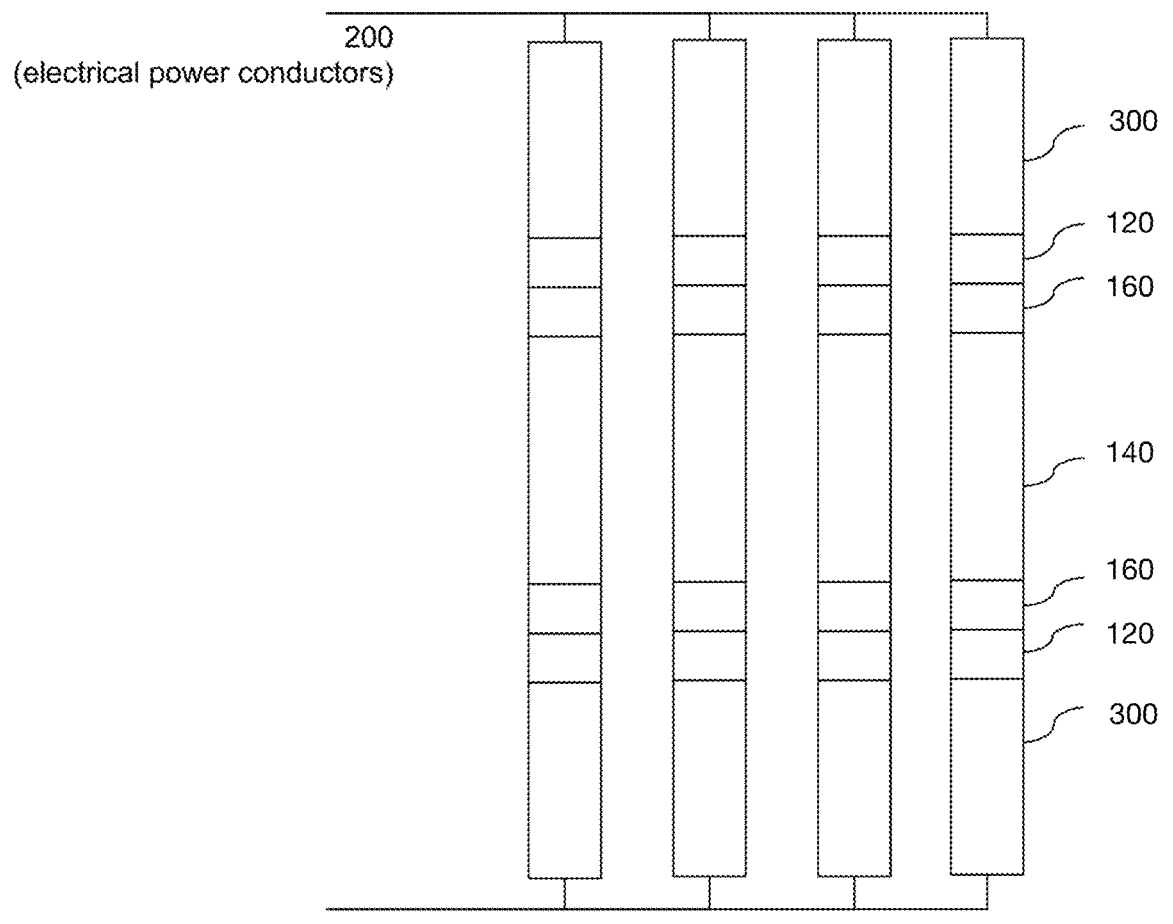
FIG. 5 is a schematic representation of a variant of a multicell reactor, where the reactor cells are in parallel

As shown in FIG. 1, the method can include: receiving a baseline signal curve S100; operating a thermal reactor S200; measuring a signal S300; optionally determining a state (e.g., state of health) of the thermal reactor S400; and controlling the thermal reactor based on the signal S500. The method functions to operate a reactor system (e.g. set of thermal reactor cells) based on electronic and process variable feedback and/or signals from individual reactor cells. The thermal reactor used in the method can be modular, include multiple reactor cells, and/or be electrically-driven. The multiple reactor cells can be in series (e.g., as shown in FIG. 4) or in parallel (e.g., as shown in FIG. 5). The thermal reactor can include resistive heaters which can be powered by an electrical power source. Other variants of the thermal reactor can use inductive heaters, dielectric heaters, and/or any other type of heater.

Figure 3:
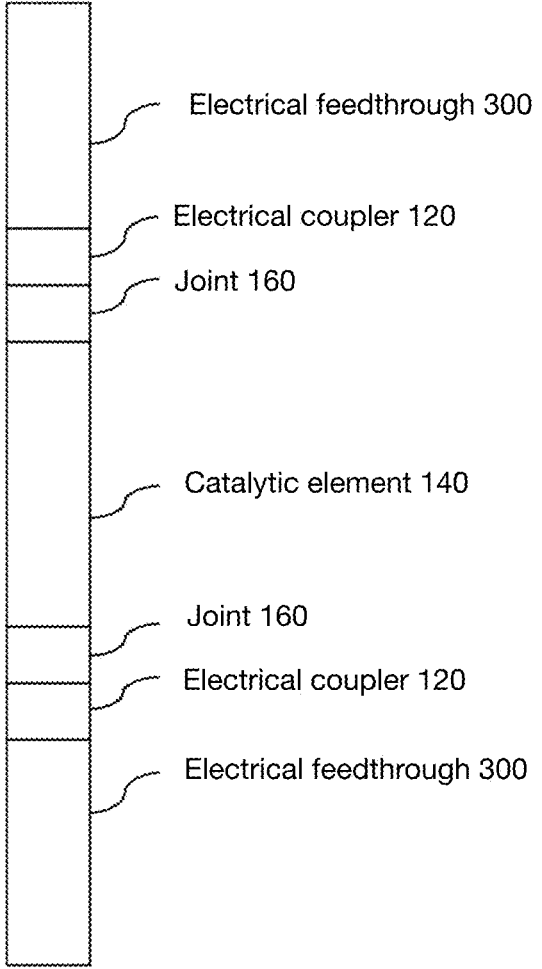
FIG. 3 is a schematic representation of a variant of a reactor cell.

FIG. 3 shows an exemplary thermal reactor cell 100 with a catalytic element 101, a joint 102 between the catalytic element and an electrical coupler 103, and an electrical lead 104 interfacing with the power source. When using electricity to generate heat via a catalytic heating element (e.g., using a reactive module or elements such as one described in U.S. patent application Ser. No. 19/038,495 titled 'REACTOR SYSTEMS FOR ENDOTHERMIC REACTIONS" filed 27 Jan. 2025, U.S. patent application Ser. No. 18/486,328 titled 'ELECTRICALLY DRIVEN CHEMICAL REACTOR USING A MODULAR CATALYTIC HEATING SYSTEM' filed 13 Oct. 2023, International Patent Application number PCT/US2023/035537 titled 'SYSTEMS AND METHODS FOR CHEMICAL CATALYTIC PROCESSING' filed 19 Oct. 2023, and/or U.S. patent application Ser. No. 18/758,642 titled 'ELECTRICAL COUPLER FOR RESISTIVELY HEATED REACTOR SYSTEMS' filed 28 Jun. 2024, each of which is incorporated in its entirety by this reference), different process control mechanisms can be implemented.

Signals (e.g., of the thermal reactor) can be measured and used in a feedback loop for the operation of the thermal reactor. The signal can be a sensor reading (or output), derived (e.g., calculated) from one or more sensor readings, inferred (e.g., from one or more sensor readings), and/or any other signal type. Examples of signals can include individual or string (e.g., for a group of cells in series electrically, fluidically, etc.) cell voltage, individual or string (e.g., for a group of cells in series electrically, fluidically, etc.) cell current, individual or string (e.g., for a group of cells in series electrically, fluidically, etc.) cell resistance, individual or strings (e.g., for a group of cells in series electrically, fluidically, etc.) cell power consumption, intra-cell and/or intra-component (e.g., between a catalytic region and a joint, between a catalytic region and electrical coupler, between electrical couplers, etc.) resistance, thermal reactor voltage, thermal reactor current, thermal reactor resistance, thermal reactor power consumption, thermal reactor resistance, temperature readings (e.g., individual readings, gradients, etc.) at any point(s) in the reactor system, inlet and/or outlet gas composition between any number of cells, inlet and/or outlet gas temperature, regenerator temperature (e.g., within one or more regenerator zones), pressure (between any number of cells, on opposing surfaces of a cell, etc.), pressure drop, flowrate, and/or any other signals. Signals can also be for a thermal reactor system (e.g. at the system-level, global, etc.). For example, global signals can include reactor inlet and outlet temperature, composition, flowrate, pressure, reaction type, gas thermal conductivity, and/or any other global parameter. Based on the signal feedback loops, the power supplied to each element, an incoming fluid composition, incoming fluid temperature (e.g., whether or not the fluid is preheated, a temperature the fluid is preheated to, etc.), and/or other suitable control parameters can be modulated (e.g., to maximize overall energy efficiency, thermal reactor life, and/or product yield). Energy efficiency can be defined as the proportion of electrical energy input converted to the sum of chemical energy (e.g., defined as, measured by, characterized as, etc. the energy content of the product such as the lower heating value (LHV) or higher heating value (HHV) of a fuel product) and recoverable sensible heat in the output gas.

Figure 7A:
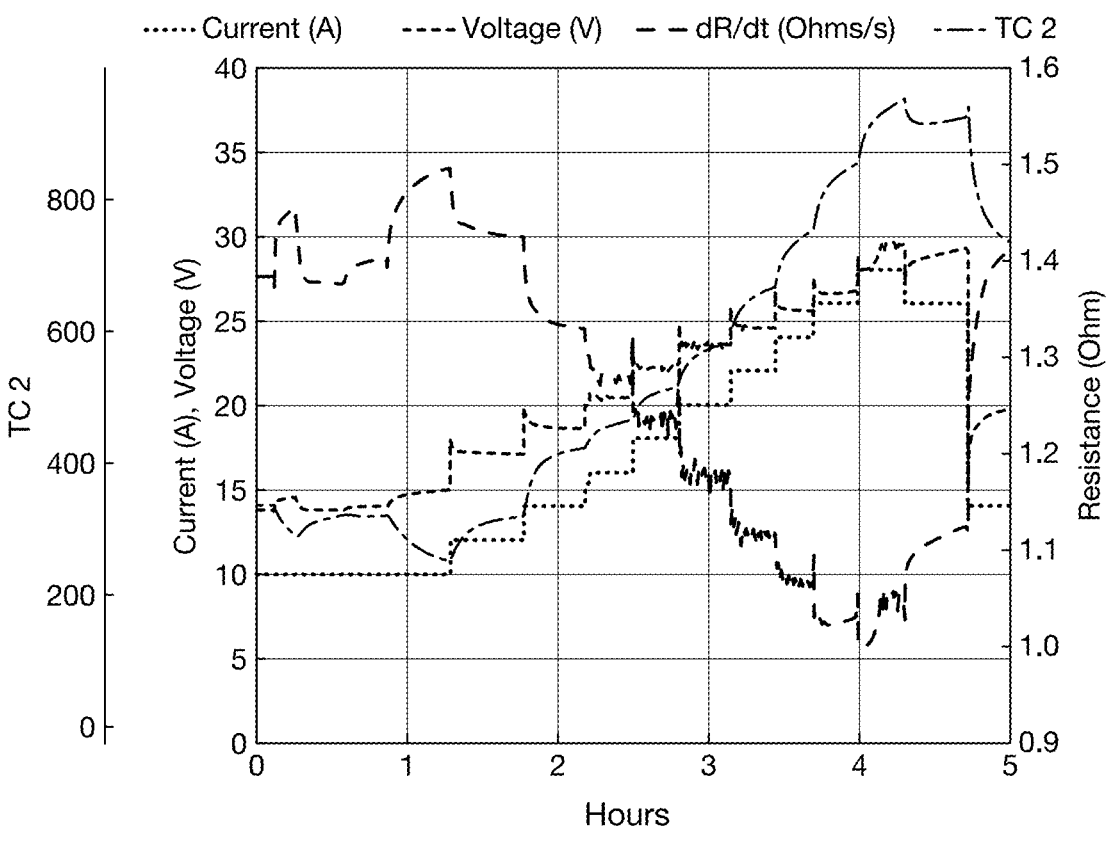
FIG. 7A shows an example of data for current, voltage, resistance, and outlet temperature (TC 2) over time under reverse water-gas shift reaction conditions.
Figure 7B:
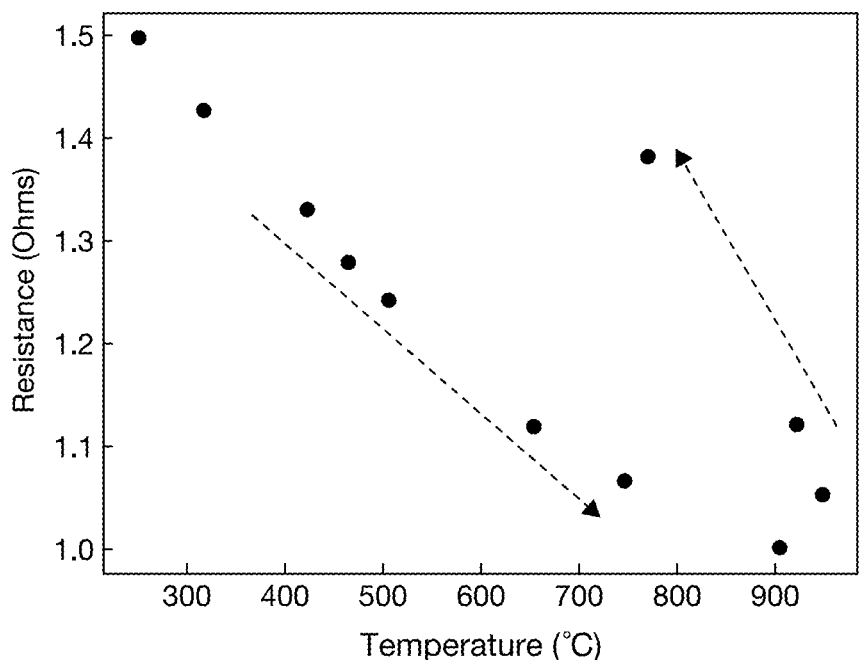
FIG. 7B shows an example of data for change in circuit resistance (averaged over each temperature hold shown in A). The change in state of health after exposure to 900° C. can be observed in this example.

Receiving a baseline signal curve S100 functions to determine a baseline signal that can be used to calibrate the thermal reactor (e.g., calibration curves, etc.), determine signal deviations during operation, and can be used to determine operational parameters and/or control instructions. In variants, the baseline signal curve can characterize an expected behavior of the thermal reactor (e.g., as a reference, for determining performance deviations and/or reactor degradation, etc.). In other variants, the baseline signal curve can function as a calibration relating the thermal reactor temperature and the power supply controls. A baseline signal curve can be received upon request, prior to determining thermal reactor operation parameters, in response to a trigger (e.g., measuring a threshold signal, etc.), while the thermal reactor is operation, periodically, at some predetermined time interval, or at any suitable time. A baseline signal relationship (e.g., baseline signal curve, baseline signal surface, etc.) can define a relationship between two or more variables. For example, a baseline signal curve can describe the relationship between a signal (e.g., resistance, voltage, current, etc.) and temperature and/or time. For example, a resistance-temperature curve can describe a change in a measured resistance with respect to temperature. Some specific example of signal curves can include resistance vs temperature or resistance vs time (e.g., given a known applied voltage and/or current). The baseline signal curve received in S100 can define an optimal or target signal-temperature and/or signal-time relationship for the thermal reactor but can alternatively define other relationships. The baseline signal curve can be defined as a continuous function (e.g., polynomial, exponential, spline interpolation), as a lookup table or piecewise-defined function, as a parametric model (e.g., Arrhenius-type relationship, linearized model, exponential decay, etc.), as a multi-dimensional surface (e.g., signal vs. temperature and time), or any suitable function. An exemplary calibration data set is represented in FIG. 7B. As shown in the example, the temperature and resistance do not follow a regular power law type variation with power input which causes the resistance to reach a minimum around 700° C. (e.g., an inflection point in the resistance curve). A calibration curve preferably accounts for irregularities that may arise from the method of manufacture of the substrate (e.g. the amount of carbon or silicon doping into the SiC matrix to control the conductivity can influence this calibration curve), but can alternatively not account for such irregularities.

The baseline signal curve can be associated with metadata which can include operating context (e.g., pressure, reactant composition, target conversion, historical operation, etc.), component identifiers (e.g., part serial numbers, catalyst type, catalytic element material, etc.), date of calibration or generation, and/or any other information.

In a variant, S100 can include receiving the baseline signal curve from a library of baseline curves. For example, a library can store baseline curves for different variables and/or relationships (e.g. resistance vs temperature, voltage vs temperature, current vs temperature, etc.), for different components of the thermal reactor (e.g., baseline signal curves for a catalytic element, for a reaction module, for a coupler-catalytic joint, a reactor cell circuit, the reactor system circuit, etc.), different ages (e.g. older reactor baseline signals, new reactor baseline signals, etc.), different reaction conditions, different reactor zones (e.g., inlet, outlet, reaction module, etc.), and/or any other relevant baseline curve categories. In variants, a single baseline signal curve or a plurality of baseline signal curves can be received (e.g., for describing a reactor system). However, baseline signal curves can be otherwise received.

Variants of the method can include measuring the baseline signal curves. For example, each baseline signal curve in the library can be determined by measuring the baseline signal curves for one or more reaction cells and/or reactor cell components. Measuring the baseline signal curve and/or calibration curve can be performed in situ (e.g., in the thermal reactor) or ex situ (e.g., on a test bench, in an experimental setting, in a furnace, etc.).

In signal-temperature curves, measuring the baseline signal curves can include establishing a controlled environment, heating a thermal reactor component to a predetermined temperature, measuring the signal of the thermal reactor component at the predetermined temperature, and repeating measuring the signal at different temperatures.

Establishing a controlled environment can enable accurate measurements and/or measurements that are relevant to the expected reaction conditions of the thermal reactor. A controlled environment can include an inert atmosphere (e.g. nitrogen, argon, etc.) to prevent unwanted reactions during calibration, a reactive environment (e.g., comprising reactants for and/or products from the chemical reaction of interest for the thermal reactor) to mimic real conditions during operation, a vacuum environment, a pressurized environment, and/or any other environment. In variants, the controlled environment can be the thermal reactor system (e.g., the baseline signal curves are measure in situ, etc.). Measuring the baseline signal curves in situ can be beneficial for determining accurate measurements relevant to the operation of the system. In other variants, baseline signal curves can be determined ex situ (e.g., in a dedicated furnace, test bench, etc.). In these variants, the controlled environment can be a furnace. Measuring the baseline curves in a furnace can be beneficial by enabling precise control of the environment and conditions (e.g., pressure, temperature, gaseous environment, introduction of reactants, etc.). A furnace can allow for uniform heating and precise control on the environmental conditions. In variants, the controlled environment can be configured to mimic either an inlet gas composition or the outlet gas composition of the thermal reactor during operation (e.g., by introducing gases relevant to the chemical reaction, etc.).

The thermal reactor component(s) (e.g. coupler, catalytic element, reaction module, cell circuit, reactor system, etc.) can be heated to a predetermined temperature. In variants where the baseline curves are measured in situ (e.g., in the thermal reactor, etc.), the components can be heated using the thermal reactor system (e.g., resistively heating the components by supplying an electrical current through the component, etc.). In variants in which the baseline curves are measured in a furnace, the components can be heated by operating a heating element of the furnace to achieve a predetermined temperature. The thermal reactor components can be otherwise heated.

Determining a baseline signal curve can include measuring the signal of the thermal reactor component at a plurality of predetermined temperatures. For example, determining temperature-resistance curves can be performed using resistance sensors (e.g. multimeters, DAQ systems with 4-wire sensing, etc.). Sensors can be positioned in the middle of the catalytic element, at the edges or surfaces of the catalytic element, at the joint between the electrical coupler and the catalytic element, at the electrical couplers, at the beginning and/or end of the reactor cell electrical circuit, across electrical leads, at the inlet and/or outlet of the thermal reactor cell, distributed across multiple reactor cells, and/or any position in the thermal reactor. In variants, the resistance (or other signals) can be monitored by placing sense lines at strategic positions within the system. In variants, voltage and/or current can be measured. For example, a known voltage can be applied and a current can be measured. Alternatively, a known current can be applied and a voltage can be measured. In these variants, a resistance can be computed from the voltage and current (e.g., using Ohm's law, $R=V/I$), resulting in a temperature-resistance data point. In other variants, power may be applied or measured (e.g., using $P=VI$). For example, if power and current are known, voltage can be inferred. Alternatively, if power and voltage are known, current can be inferred. The resulting values can be used to determine resistance and/or correlate with temperature. However, any signal can be measured.

Determining a baseline signal curve can include repeatedly measuring the signal at different temperatures. A baseline signal curve can include measurements at a plurality of different temperatures. For example, a measurement can be sampled uniformly (e.g. every 1° C., every 5° C., every 10° C., or any other value, etc.), non-uniformly, adaptively, based on a change of signal (e.g., sampling more around temperatures that show large changes in the measured values, etc.), or using any suitable method. Measuring the signal at different temperatures can include ensuring that the thermal reactor component reaches the desired temperature (e.g., using a thermocouple, etc.). In variants, the measurements can be repeated (either in the same direction or in opposing directions such as switching between ramping up the temperature and ramping down a temperature for a next iteration, etc.) to test for hysteresis.

Variants of the method can additionally or alternatively include measuring signal-time curves. Measuring signal-time curves can include establishing a controlled environment, applying a known voltage and/or current to a thermal reactor, and measuring a signal (e.g. resistance, temperature, etc.) with respect to time. Data points can be sampled uniformly (e.g., periodically, every 10 seconds, every 15 seconds, every 30 seconds, every minute, every 5 minutes, every 10 minutes, every 20 minutes, every 30 minutes, every hour, and/or any suitable interval), non-uniformly, adaptively (e.g., sampling more when large changes in the signal are observed, etc.) or in any suitably method.

Variants of the method can include processing the baseline signal curves. Determining the baseline signal curve can include processing steps such as interpolation, curve fitting, noise removal, normalization, unit conversions, and/or other processing steps. The baseline signal curve can be otherwise measured.

However, measuring a baseline signal curve S100 can be otherwise performed.

Operating a thermal reactor S200 functions to perform (e.g., facilitate, enable, initiate, maintain, etc.) a reaction between two or more chemical species. The operation control points for operating a thermal reactor S200 can include power (e.g., voltage, current), pressure, flow rate of reactants, reactant composition, temperature setpoints (e.g., for regenerator temperature, for reactor cell temperature, for outlet fluid, for inlet fluid, etc.), reaction time (e.g., dwell time, time between switching regenerator flow direction, etc.), and/or any other control points. The thermal reactor cells of S200 can be operated together or independently. In variants, operating a thermal reactor S200 includes heating a catalytic element; and introducing reactants to the reactor.

Heating a catalytic element can be performed by resistively heating the catalytic element. Resistively heating the catalytic element can include supplying an electrical current through a catalytic element via electrical couplers and/or an electrical lead. In variants, heating the catalytic element can include inductive heating, radiative heating, microwave heating, dielectric heating, Joule heating (e.g. via embedded conductive pathways, etc.), plasma-assisted heating, heating via thermally conductive support structures (e.g., heated metal substrates or ceramic elements, etc.), or any other suitable method.

However, heating a catalytic element may be otherwise performed.

Introducing reactants to the reactor functions to react the reactants. The reactants are typically in the fluid phase (e.g., gas, liquid, plasma, etc.). However, one or more chemical species can alternatively be in the solid phase and/or any other suitable phases of matter. The reactor can be used to perform a reverse gas water shift reaction (e.g., $H_2+CO_2 \rightarrow H_2O+CO$). Additionally or alternatively, the thermal reactor can be used to perform steam methane reforming ($CH_4+H_2O \rightarrow CO+3H_2$), dry methane reforming ($CH_4+CO_2 \rightarrow 2CO+2H_2$), hydrocarbon reforming (e.g. C1-C4 gases such as methane, ethane, ethene, ethyne, propane, propyne, butane, but-1-ene, but-2-ene, but-1-yne, but-2-yne, 2-methylpropane, 2-methylprop-1-ene, cyclopropane, cyclopropane, 1-methylcyclopropane, etc.; naphtha; other hydrocarbon conversion to carbon monoxide and hydrogen, etc.), Haber process ($N_2+3H_2 \rightarrow 2NH_3$), Kværner process ($C_nH_m \rightarrow nC+m/2H_2$), and/or other suitable industrial processes (particularly using gas phase reactants and ideally gas phase products, endothermic reactions, etc.). Example reactants can include hydrogen, carbon dioxide, carbon monoxide, water, hydrocarbons (e.g., methane, ethane, propane, butane, ethylene, propylene, etc.), oxygen, nitrogen, argon, helium, and/or any other reactants. Reactants can be introduced at a predetermined pressure, flow rate, composition, temperature (e.g., for inlet fluid, etc.), reaction time (e.g., dwell time, time between switching regenerator flow direction, etc.), or any suitable parameter.

Introducing reactants can be otherwise performed and/or operating a thermal reactor S200 may be otherwise performed.

Measuring a signal S300 functions to determine (e.g., measure, monitor, etc.) a signal (e.g., to assess the operational state of thermal reactor for degradation or performance drift, to be compared with the baseline signal curve for diagnosis or control feedback, to determine a thermal reactor state, etc.). S300 can be performed: during operation of thermal reactor S200, contemporaneously with operation of the thermal reactor, at predefined intervals, sporadically, on-demand, and/or at any other time. The signal in S300 can be measured continuously, periodically, in real-time, sporadically, according to an event trigger, and/or any other measurement timing. Examples of signals can include temperature, resistance, current, voltage, and/or any other signal. The signals are preferably electrical signals (e.g., current, voltage, electrical power, etc.). In variants, the derivatives of the signals (e.g., with respect to time, temperature, etc.) can be determined (e.g. computed, calculated, measured, etc.). For example, $dR/dt$ can be computed which can be further used to assess the thermal reactor, determine operation setpoints, or used for any other step. Alternatively, $dV/dt$, $dI/dt$, $dW/dt$, $d^2R/dt^2$, $d^2V/dt^2$, $d^2I/dt^2$, $d^2W/dt^2$, $dR/dT$, $dV/dT$, $dI/dT$, $dW/dT$, $d^2R/dT^2$, $d^2V/dT^2$, $d^2I/dT^2$, $d^2W/dT^2$, $d^2R/dtdT$, $d^2V/dtdT$, $d^2I/dtdT$, $d^2W/dtdT$, or any other derivative(s) can be determined. The measured signals can be for the reactor system (e.g. global monitoring), for a reactor cell, for specific components (e.g. electrical couplers, catalytic element, electrodes, inlet, outlet, etc.), between components (e.g. intra-component), or for any portions of the thermal reactor.

S300 can include measuring one signal or a plurality of signals. For example, S300 can include measuring temperature, voltage, and chemical composition of the outlet. In another variant, current and temperature are measured. In a specific variant of S300, temperature is not directly measured. In this variant, resistance can serve as a proxy for temperature of the catalytic element (e.g., using a resistance-temperature calibration curve).

The step can be performed using voltage sensors (e.g., differential voltage probes, instrumentation amplifiers, voltage divider circuit, etc.), current sensors (e.g., hall effect sensor, etc.), VI probes, can be performed using resistance sensors (e.g. multimeter, ohmmeter, 2-wire resistance measurement, 4-wire Kelvin sensing, etc.), thermocouples, thermistors, chemical composition sensors (e.g., NDIR gas analyzers, electrochemical gas sensors, mass spectrometers, gas chromatography, etc.), pressure sensors (e.g., piezoelectric pressure transducer, strain gauge pressure sensor, MEMs pressure sensors, differential pressure sensors, etc.), flow rate sensors (e.g., thermal mass flow meter, Coriolis flow peter, ultrasonic flow meter, rotameter, MEMs flow sensor, etc.), electrochemical impedance spectroscopy (EIS) sensor, and/or using any type of sensor.

However, measuring a signal S300 may be otherwise performed.

The method can optionally include determining a state (e.g., state of health) of the thermal reactor S400, which functions to characterize the thermal reactor (e.g., to determine a reaction environment condition, to assess thermal reactor health, and/or any other suitable characterization of the thermal reactor). S400 can be performed contemporaneously with measuring the signal, periodically, at a predetermined interval, sporadically, in response to a trigger (e.g. measuring a threshold signal value, etc.) and/or at any other time. S400 can be performed by a computing system, manually, or using any other method.

In a first variant, determining a state can include determining a temperature. In variants in which a voltage and current is measured, a temperature can be determined by computing a resistance (e.g., based on Ohm's Law, electrical power relationship, etc.) and referencing a baseline signal curve (e.g., a resistance-temperature curve) to estimate a temperature. Determining a temperature can include using interpolation to estimate temperature values between discrete baseline curve points, evaluating an equation at a resistance value to calculate a temperature, and/or any other temperature determination method. The inventors have found that determining a temperature using resistance can provide a technical advantage of not requiring temperature sensors (e.g. which can have performance issues in reactive environment, etc.) and can enable faster response times during operation in some variants. However, temperature can be otherwise determined.

In a second variant, determining a state (e.g., a state of health, etc.) can include determining degradation. In variants in which a voltage and current is measured, determining degradation can include computing a resistance. The resistance can be compared with an expected resistance (e.g., from a baseline signal curve). For example, a resistance measured at a specific time (e.g., a specific time after turning on the reactor) can be compared with the expected resistance for that time (e.g. from a resistance-time baseline signal curve, etc.). For example, an expected and measured steady-state resistance can be compared. In another example, a measured temperature and resistance can be compared with an expected resistance and/or temperature (e.g. from a resistance-temperature curve, etc.). Deviation from an expected resistance and/or temperature can be indication of degradation (e.g. structural and/or compositional changes, mechanical damage, etc.). In a variant, degradation can be detected when a deviation and/or difference between an expected and measured signal exceed a predetermined threshold value. The predetermined threshold can be characterized by a percentage (e.g. percentage difference, etc.) or a raw delta value (e.g., for resistance, 5 ohms, 10 ohms, 20 ohms, 100 ohms, 1000 ohms, or any suitable value; for temperature, 1° C., 5° C., 10° C., 50° C., 100° C., 200° C., 500° C., or any suitable value; etc.). Measuring a higher resistance than the expected resistance (e.g. 2% higher, 5% higher, 10% higher, etc.) can indicate degradation (e.g., in a joint between the electrical coupler and the catalytic element, in the catalytic element, in a connection between the electrical coupler and an electrical lead, etc.). The location of degradation can be determined based on the location of the sensor that measures a signal that deviates from an expected value. For example, if a sensor at the joint between the catalytic element and coupler measures an increased resistance, this can indicate degradation of a joining material. In variants, voltage can increase when the component experiences degradation (which will typically affect the conductivity of the part). In some variants, characterizing the components that are not expected to change (e.g. power feedthroughs) but whose resistance can change with temperature (e.g. a metallic power feedthrough's resistance will increase with temperature in a predictable way) can improve determination of component degradation. For instance, using calibrated signal baseline curves for stable components can help isolate unexpected changes to more susceptible components (e.g. the joint bond or the cell substrate itself).

In variants, degradation can be determined and/or characterized using a degradation model. The degradation model can be based on historical experimental model, physical models, environmental history, and/or any relevant data. The degradation model can include a machine learning model, a statistical model, an analytical model, and/or any other model. In a variant, the measured signal can be used as input to the degradation model to predict a level and/or state of degradation (e.g., a state of health, etc.).

In variants, degradation can be further characterized using impedance spectroscopy, time domain reflectory response, vector network analyzer characterization, or any other methods. Using impedance spectroscopy can identify the location of a resistance change in a circuit in more detail. As impedance spectroscopy shows the reflection or transmission of an RF signal through the discontinuities (e.g. components) in the system, relative changes can be used to determine the cause of the overall/bulk resistance change. Additionally or alternatively, the measured conversion of the reactants (e.g., measured at an outlet) can be compared against the expected conversion based on the resistance (e.g., expected temperature) of the catalytic element(s) to determine a thermal reactor efficiency, quantify the thermal reactor health, and determine degradation. Degradation or a state of health can be otherwise determined.

However, determining a state (e.g., state of health) of the thermal reactor S400 may be otherwise performed.

Controlling the thermal reactor based on the signal S500 functions to operate the thermal reactor based on the signal (e.g., to achieve target reaction conditions, to adjust operation based on degradation levels, and/or any other suitable operation adjustments). In variants, the thermal reactor can be controlled based on the state of thermal reactor. For example, the thermal reactor can be controlled based on an estimated temperature (e.g. determined from the baseline curves). S500 can be performed: in real time, contemporaneously with measuring the signals, when a thermal reactor state is determined, after new operation setpoints are determined, and/or at any other suitable time. In variants, S500 can include controlling the power supply, reactant flow valves, and/or any other component. S500 can include separately controlling components and/or separately controlling reactor cells. In variants, the thermal reactor cells of a thermal reactor can be controlled in an interdependent manner (e.g., a series of cells can be controlled contemporaneously, one cell can impact the operation of another cell, etc.). This implementation can be beneficial as it can eliminate the need for direct temperature measurement at each cell and/or location (where temperature measurement can be particularly difficult when the reaction environment can be corrosive to thermocouple materials such as in the reverse water-gas shift reaction environment at temperature above 1,000° C., where the presence of hydrogen and CO can be damaging to metallic components). In some implementations, the composition of the substrate can be modified to limit changes in resistance over the lifetime of use (e.g. the addition of high temperature ceramics or the use of alternate conductive components such as molybdenum disilicide). In variants of the thermal reactor that include multiple cells, each cell can be operated independently and the impact on the overall reaction conversion and system energy efficiency assessed. An example of this behavior is shown in FIG. 7A (e.g., for an example of reverse water-gas shift data obtained on a silicon carbide-based substrate such as a 0.95" diameter×4" length substrate wash-coated with a 33 wt % $Ni/Al_2O_3$ catalyst; where the element is bonded to stainless steel electrical couplers (electrodes) with conductive carbon paste; where the cell is insulated with ceramic and housed inside a stainless steel vessel; where electrical contact is made to the cell using copper feedthroughs; where the catalyst is heated by applying DC power to the catalyst assembly; where the reactor was initially heated in argon resulting in an initial increase in resistance at 0.1 hours due to the change from the setup stage (argon environment) to the introduction of 100% hydrogen gas flow into the system; where at 0.3 hrs, hydrogen is replaced with argon again; where at 0.6 hrs, argon is replaced with pure $CO_2$; where at 0.8 hrs, hydrogen is added to generate a 3:1 ratio of $H_2:CO$ in the inlet gas; and where beyond this point, the power input into the catalytic cell is modulated by an external DC power supply). The resistance of the element circuit can decrease as the temperature is increased through the addition of power (via current control) from the power supply. This can be seen from the plateaus at each increasing current setpoint.

S500 can include determining control and/or operation setpoints. The control setpoints can be determined manually, using a computing system (e.g. using models, iterative learning control methods, etc.), or using any other method. The operation setpoints can be determined to achieve a desired reaction environment (e.g., temperature, flow rate, etc.) and/or optimize reaction rate, energy efficiency, or any suitable metric.

In a first variant, determining control and/or operation setpoints can include using a machine learning model. In variants, a machine learning model (e.g. multilayer perceptron, neural network, deep neural network, recurrent neural network, convolutional neural network, reinforcement learning model, transformer, etc.) can be trained to determine control setpoints (e.g., voltage, current, flow rate, inlet composition, inlet temperature, etc.) based on the measured signals to optimize reaction rate. Inputs of the model can include measured signals (e.g., voltage, current, current density, temperature, etc.), determined reactor states (e.g., temperature, state of health, degradation levels, degradation model output, etc.), prior reactor control setpoints, reactor system metadata (e.g., age, type, materials, reaction type, etc.), and/or any other relevant inputs. Outputs of the machine learning model can include control setpoints (e.g., voltage, current, desired measured resistance, flow rate, inlet composition, inlet temperature, etc.). The machine learning model can be trained on a set of training data, which can include operation settings, historical experimental data, environmental history, measured signals, conversion rate, reaction yields, energy consumption, or any other data. As an example, the model can be trained to learn the relationships between measured signals, operation settings, reaction rate, and/or any other relevant parameters and determine operation settings to optimize reaction rate. Additionally and/or alternatively, the model can be trained to optimize energy efficiency, product yield, thermal reactor lifetime, and/or any other optimization targets. However, the machine learning model can be trained in any suitable manner.

In a second variant, determining control and/or operation setpoints can include using heuristics. In variants, a set of predetermined heuristics and/or rules can be used to determine setpoints. For example, a set of adjustments can be performed based on the occurrence of features in the signal measurements (e.g., increases or decreases in signal value, spikes in signal value, etc.). The heuristics can be tiered or conditional. In a specific example, a control setpoint for current (e.g. current density, etc.) can automatically decrease by a predetermined number of amperes when a measured resistance decreases by threshold amount. In a second example of a heuristic, a current can be reduced by 5 A when the resistance increases by 10% above the baseline value. Other examples can include increasing an inlet pressure when gas flow rate falls below a threshold, increasing a current pulse duration to promote reaction completion when a spike (e.g., increase) in reactants in the outlet gas composition is detected, adjusting a power source voltage when the resistance moves beyond a threshold value. increasing a current when an estimated temperature is less than a threshold value. However, any heuristic can be used.

In a third variant, determining control and/or operation setpoints can include using an algorithm. In variants, a control algorithm (e.g., proportional-integral-derivative (PID) controller, model predictive control (MPC), rule-based logic, etc.) can be used to determine control setpoints based on measured signals. For example, a PID controller can adjust the setpoint (e.g., voltage or current) to minimize the error between a measured signal (e.g., resistance or temperature) and a target value. In another example, a model predictive control algorithm can use a mathematical model of the reactor system to forecast future states and optimize setpoints over a control horizon. Algorithms can be designed to use real-time signal feedback to maintain target reaction conditions or adjust for system deviations (e.g., due to degradation, instability, or fluctuation in reactant concentrations). Any suitable algorithm can be used to compute control setpoints based on the signals. Alternatively, operation setpoints can be determined based on physical relationships (e.g., formulas or equations), empirical models, and/or other suitable implementation details. Using machine learning models, heuristics, algorithms, and other methods to determine operation setpoints can allow for quick determination of setpoints, resulting in a responsive feedback loop.

In a specific variant, a reactor operation model (e.g., a trained machine learning model, heuristic model based on historical experimental data, a physical model, an environmental history model, etc.) can receive, as input, the measured signal, a degradation state (e.g., predicted from the degradation model, measured, calculated, etc.), a baseline signal curve, sensor readings, and/or any other suitable data, to predict (e.g., estimate) a desired resistance of the catalytic element (e.g., to achieve a predetermined reaction temperature or target reaction temperature). In some variations of this variant, the desired resistance can be determined as a function of time (e.g., to achieve a target temperature profile in time, to account for operating time of the thermal reactor or components thereof, etc.). In this variant, the reactor operation model can output a voltage, current, and/or power to achieve the desired resistance (and consequently the target reaction temperature within the catalytic region, optionally as a function of time).

S500 can include operating the thermal reactor based on the setpoints. Operating the thermal reactor based on the setpoints can be performed automatically, semi-automatically, manually, and/or any other suitable method. The thermal reactor can be automatically controlled based on the setpoints using a controller.

Figure 9:
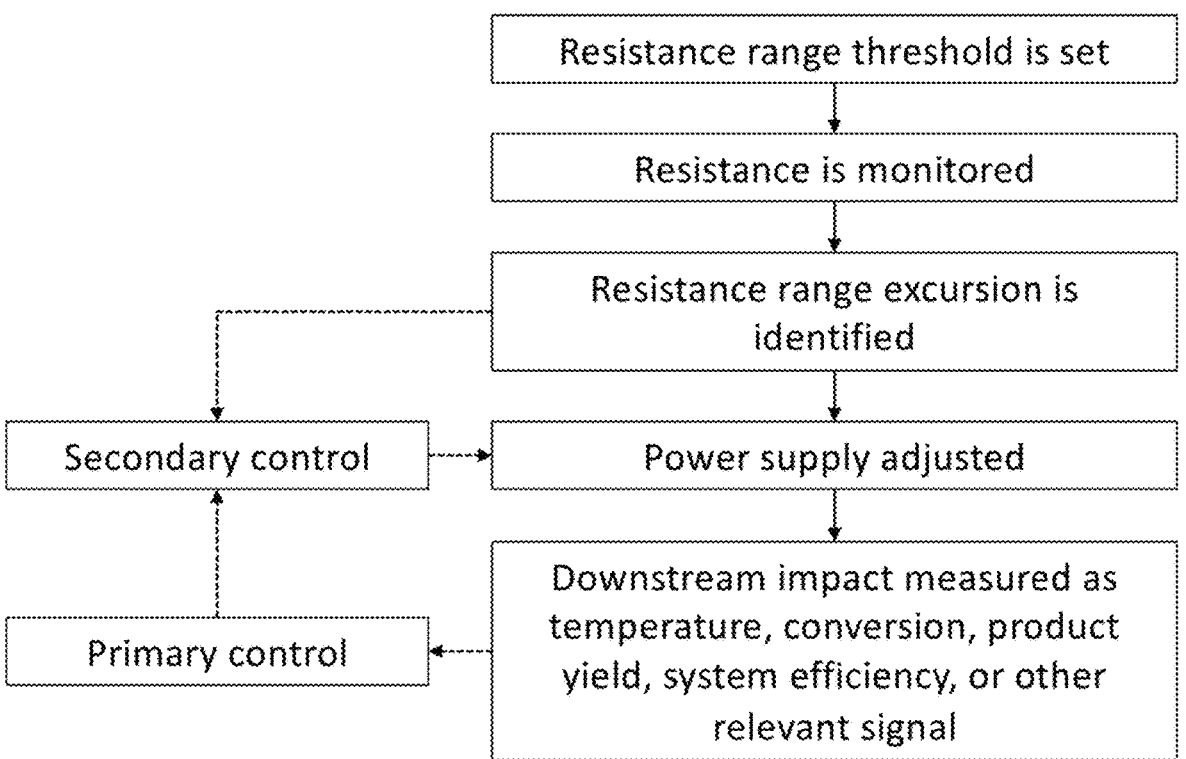
FIGS. 9 and 10 are schematic representations of variants of control schemes for controlling operation of a reactor system.
Figure 10:
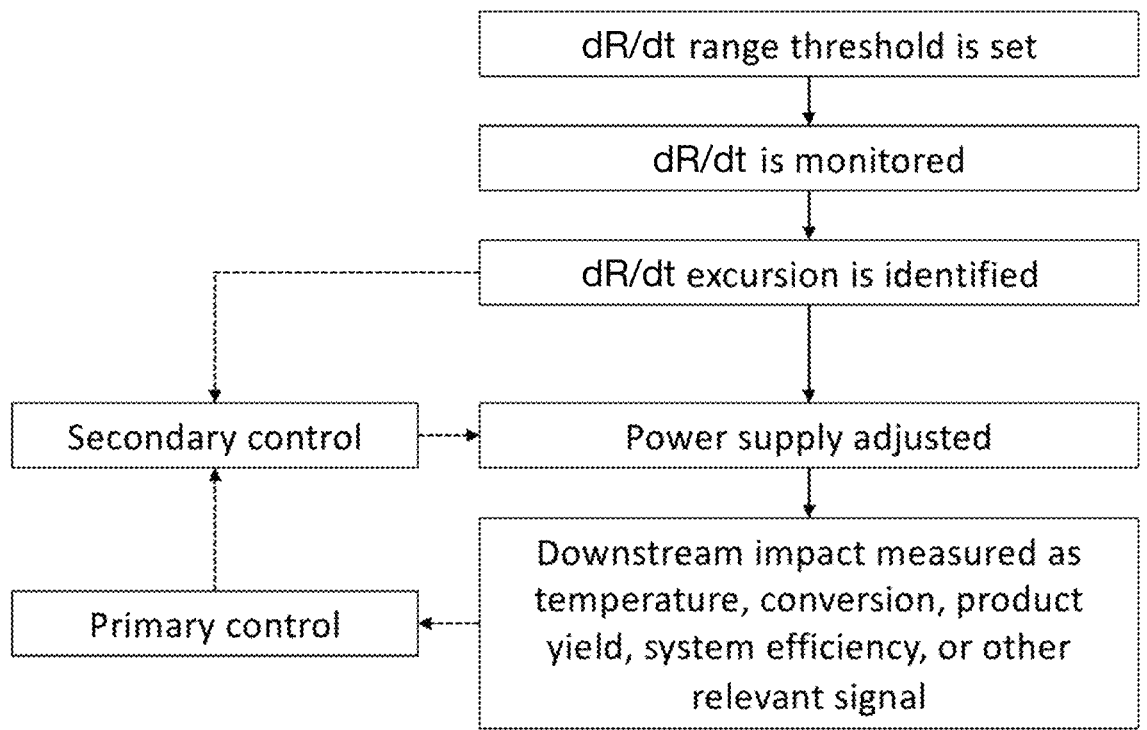

The actuation mechanisms can include electronic current regulators, power supply modulation, flow control valves (e.g., solenoid valves, proportional control valves), gas mixers or proportioners, and/or any other actuation mechanism. In variants, the power supply is controlled to modulate the temperature of the thermal reactor. In a specific example, controlling the reactor system can include monitoring the reactor inlet flowrate, outlet composition, and temperature or resistance of each cell. The flowrate, temperature, and composition at the inlet can determine the heat load of the reactor (e.g., based on heat of reaction and the desired reaction temperature). The power can then be adjusted and the resistance (and thereby temperature) of each cell can be monitored to ensure that the local conditions maintain the required conversion and overall energy efficiency. Examples of cascade-type control mechanisms based on the resistance and/or its derivatives (with respect to time, with respect to temperature, etc.) are shown in FIG. 9 and FIG. 10. However, the reactor system can be otherwise controlled.

However, controlling the thermal reactor based on the signal S500 may be otherwise performed.

4. Thermal Reactor

As shown in FIG. 2, the thermal reactor can include one or more of a reaction module 100 (e.g., an electrical coupler 120 or electrode and catalytic element 140, etc.); power source 200, electrical feedthroughs 300 (e.g., leads, supports, etc.), sensors 400, joints, inlets and/or outlets (e.g., reagent and/or product ports), a computing system 500, and/or other suitable elements.

The thermal reactor preferably functions to perform (e.g., facilitate, enable, initiate, maintain, etc.) a chemical reaction at an elevated temperature. The reactants are typically in a fluid phase (e.g., gas, liquid, plasma, etc.). However, one or more reactants could be in the solid phase and/or any other suitable phases of matter. Nonlimiting examples of chemical reactions that can be performed using the thermal reactor can include a reverse gas water shift reaction (e.g., $H_2+CO_2 \rightarrow H_2O+CO$), steam methane reforming ($CH_4+H_2O \rightarrow CO+3H_2$), dry methane reforming ($CH_4+CO_2 \rightarrow 2CO+2H_2$), hydrocarbon reforming (e.g. C1-C4 gases, naphtha, etc. combined with water or carbon dioxide to form carbon monoxide and hydrogen), Haber process ($N_2+3H_2 \rightarrow 2NH_3$), Kværner process ($C_nH_m \rightarrow nC+m/2H_2$), hydrocarbon cracking (e.g., reducing a hydrocarbon chain length), and/or other suitable industrial processes (particularly using gas phase reactants and ideally producing gas phase products, endothermic reactions, etc.). Exemplary thermal reactors include reactors as described in U.S. patent application Ser. No. 18/486,328 titled 'ELECTRICALLY DRIVEN CHEMICAL REACTOR USING A MODULAR CATALYTIC HEATING SYSTEM' filed 13 Oct. 2023, U.S. patent application Ser. No. 19/118,941 titled 'SYSTEMS AND METHODS FOR CHEMICAL CATALYTIC PROCESSING' filed 7 Apr. 2025, U.S. patent application Ser. No. 19/212,178 titled "ELECTRICAL COUPLER FOR RESISTIVELY HEATED REACTOR SYSTEMS" filed 19 May 2025, or U.S. patent application Ser. No. 19/038,495 titled "REACTOR SYSTEMS FOR ENDOTHERMIC REACTIONS" filed 27 Jan. 2025, each of which is incorporated in its entirety by this reference.

The system can include a thermal reactor cell or a plurality or thermal reactor cells. Each thermal reactor cell can include a reaction module (e.g., an electrical coupler or electrode and a catalytic element), electrical feedthroughs (e.g., leads, supports, etc.), sensors, joints, inlets and/or outlets (e.g., reagent and/or product ports), optionally an independent power supply, and/or other suitable elements. The thermal reactor cells can be arranged in series, in parallel, and/or otherwise arranged.

The reaction module(s) 100 preferably function as a site for chemical reactions to be performed. In variants of the thermal reactor that include a plurality of reaction modules 300, the reaction modules can be arranged in parallel (e.g., fluid flows through each reaction module occur contemporaneously, concurrently, simultaneously, etc.), in series (e.g., fluid from one reaction module to a subsequent reaction module), and/or in any suitable combination thereof (e.g., a plurality of parallel reaction modules where one or more of the plurality include a plurality of reaction modules in series, branching reaction modules, etc.).

The reaction module 100 (e.g., a catalytic element thereof) preferably achieves a high operating temperature (e.g., greater than about 500° C., 600° C., 750° C., 800° C., 900° C., 1000° C., 1100° C., 1250° C., 1300° C., 1500° C., 2000° C., 2500° C., etc.), which can be beneficial for driving an equilibrium of the chemical reaction to preferred products. However, the thermal reactor can operate at any suitable temperature. The reaction temperature of the reaction module 300 is preferably achieved via resistive heating (e.g., Joule heating, Ohmic heating, etc.). For example, an electrical current supplied from the power source can be supplied to the reaction module through the electrical leads to heat a catalytic element. However, the reaction temperature can otherwise be achieved (e.g., dielectric heating, induction heating, etc. for suitable catalytic elements, reaction modules, etc.).

A reaction module 100 can include an electrical coupler 120 and a catalytic element 140. The electrical coupler and catalytic element can be mechanically coupled, chemically coupled, integrated into a single element, and/or can otherwise be coupled. For example, the electrical coupler and catalytic element can be coupled using mechanical components (e.g., clamps, screws, etc.), adhesives, integrated bonding layers, chemical bonds (e.g., as described in U.S. patent application Ser. No. 19/279,728 titled 'JOINED ELECTRICAL COUPLER AND CATALYTIC MATERIAL AND METHOD FOR PRODUCING THEREOF' filed 24 Jul. 2025 which is incorporated in its entirety by this reference), and/or any suitable method.

In variants, the reaction module includes an electrical coupler 120 and a catalytic element 140.

The electrical coupler 120 functions to apply an electrical current across a catalytic element of the thermal reactor. A reaction module preferably includes two electrical couplers 120. However, greater numbers of electrical couplers can be used (e.g., a plurality of anodes and/or cathodes) which can be beneficial for improving a uniformity of heating of the catalytic element (e.g., by improving a uniformity of electric current, potential drop, etc. through the catalytic element). In some variants, a single electrical coupler can be used (e.g., where the electrical coupler is designed to have an anode and cathode regions and the catalytic element is designed to pass current throughout the catalytic element rather than shorting across a region of the catalytic element proximal the electric coupler).

The electrical coupler 120 can be made of a refractory material (e.g., a semiconducting, electrically conductive, etc. refractory material), metal (e.g., refractory metal), and/or combination thereof (e.g., a cermet material). Nonlimiting examples of electrical coupler 320 materials can include: carbon (e.g., graphite electrodes), carbide (e.g., silicon-silicon carbide, carbon-silicon carbide), carbides (e.g., tungsten carbide, molybdenum carbide, titanium carbide, vanadium carbide, chromium carbide, zirconium carbide, niobium carbide, molybdenum carbide, ruthenium carbide, rhodium carbide, hafnium carbide, tantalum carbide, tungsten carbide, rhenium carbide, osmium carbide, iridium carbide, etc.), silicides (e.g., platinum silicide, titanium silicide, vanadium silicide, chromium silicide, zirconium silicide, niobium silicide, molybdenum silicide, ruthenium silicide, rhodium silicide, hafnium silicide, tantalum silicide, tungsten silicide, rhenium silicide, osmium silicide, iridium silicide, neptunium silicide, etc.), titanium, vanadium, chromium, zirconium, niobium, molybdenum, ruthenium, rhodium, hafnium, tantalum, tungsten, rhenium, osmium, iridium, borides (e.g., titanium boride, zirconium boride, hafnium boride, tantalum boride, tungsten boride, etc.), alloys or composites therebetween, and/or other similar materials. In some variations, the electrical coupler 120 material can include dopants (e.g., metal dopants, p-type dopants, n-type dopants, etc.) to increase a conductivity of the electrical coupler 120. The electrical coupler 120 is preferably substantially fully densified (e.g., void space of less than about 5% by volume of a bounding convex hull around a surface of the electrical coupler), which can be beneficial for ensuring that the electrical coupler 120 has a lower electrical resistance than the catalytic region. However, the low electrical resistance (e.g., intrinsic to the coupler, in relation to the catalytic region, etc.) can otherwise be achieved (e.g., based on a geometry of the electrical coupler region, a material of the electrical coupler region, additive(s) included in the electrical coupler region, a porosity of the catalytic region, a geometry of the catalytic region, a material of the catalytic region, additive included in the catalytic region, etc.).

The catalytic element 140 functions to drive (e.g., increase a reaction rate, decrease a reaction energy barrier, etc.) one or more target chemical reactions. The catalytic element 340 can be chemically and/or mechanically coupled to the contact end of the electrical coupler. The catalytic element 340 can be cylindrical, prismatoid (e.g., pyramidal, prismatic, antiprismatic, parallelepipedal, cupolaed, frustral, cube, rectangular prism, triangular prism, pentagonal prism, etc.), toroidal (e.g., square toroid, rectangular toroid, hexagonal toroid, degenerate toroid, etc.), conical, and/or can have other suitable shapes (typically but not necessarily a 3D shape with two planar broad surface ends). The catalytic element 340 can be partially formed from an electrically conductive or semiconducting material. In some variants, the catalytic element can be formed wholly from electrically conductive or semiconducting material. In some variants, the catalytic element can be formed from an electrically conductive material with a catalytic material applied thereto.

The catalytic element 340 can include: a substrate, a catalyst, and/or any suitable components. In some variants, the substrate can be formed from catalyst material (e.g., the substrate and catalyst can be the same). The substrate of the catalytic element 340 can function to support the catalyst and/or heat the catalyst and/or reactants. The substrate can additionally or alternatively function to mix the reactants (e.g., by introducing turbulence into the fluid flow), increase a residence time of the reactants proximal the catalyst (e.g., by forming a tortuous pathway through the substrate), and/or can otherwise function to enhance the catalytic process. The substrate can be formed from a refractory material, refractory metal, and/or combinations thereof (e.g., cermet). For instance, the substrate can be made from the same or a different material that the electrical coupler can be formed from (carbon, silicon-carbide, tungsten carbide, molybdenum carbide, titanium carbide, vanadium carbide, chromium carbide, zirconium carbide, niobium carbide, molybdenum carbide, ruthenium carbide, rhodium carbide, hafnium carbide, tantalum carbide, tungsten carbide, rhenium carbide, osmium carbide, iridium carbide, platinum silicide, titanium silicide, vanadium silicide, chromium silicide, zirconium silicide, niobium silicide, molybdenum silicide, ruthenium silicide, rhodium silicide, hafnium silicide, tantalum silicide, tungsten silicide, rhenium silicide, osmium silicide, iridium silicide, neptunium silicide, titanium, vanadium, chromium, zirconium, niobium, molybdenum, ruthenium, rhodium, hafnium, tantalum, tungsten, rhenium, osmium, iridium, alloys or composites therebetween, and/or any other materials). Other examples of substrate materials can include oxides (e.g., titania, alumina, ceria, zinc oxide, zirconia, silica, etc.), nitrides, silicides, borides, and/or other suitable materials (e.g., which can include dopants to modify the electrical properties of the substrate to promote uniform thermal and/or electrical distributions throughout the catalytic element).

The substrate preferably has a high specific surface area (e.g., to promote reaction sites) such as $\geq 1$ m$^2$/g, $\geq 10$ m$^2$/g, $\geq 100$ m$^2$/g, $\geq 1000$ m$^2$/g, and/or other surface area (e.g., BET surface area). However, the substrate can have any suitable specific surface area. The substrate is preferably a porous material (e.g., a material with a porosity greater than 5%, a material with a solid material volume of at most 95%, etc.). For example, the substrate can be a foam (e.g., open-celled foam, stochastic foam, regular foam, etc.), a woven-fiber, periodic open cell structure, lattice, a sponge, and/or can have any suitable structure. However, the substrate can additionally or alternatively be a solid material (e.g., mesh, ribbon, etc.), include engineered structures (e.g., a roughened surface to facilitate a large surface area), and/or can otherwise be formed and/or constructed.

The catalyst functions to reduce an activation energy of a target chemical reaction (e.g., increase a reaction rate, promote reaction centers, etc.). The catalyst is preferably disposed on (e.g., coated on, adhered to, absorbed on, adsorbed on, etc.) the substrate. Additionally or alternatively, the catalytic element 340 can be integrated into the substrate (e.g., where at least a portion of the catalyst material protrudes from the substrate material), can be disposed on the electrical coupler (e.g., to increase the total catalyst loading within the reaction module and/or reactor), and/or can otherwise be arranged. In an example, catalyst materials (e.g., for the RWGS reaction) can include: oxides (e.g., iron oxide, chromium oxide, copper oxide, aluminium oxide, zinc oxide, cerium oxide, iron oxide, manganese oxide, indium oxide, nickel oxide, spinel oxides, solid solution oxides, perovskite-type oxides, composites or combinations thereof, etc.), metal catalysts (e.g., platinum, palladium, gold rhodium, ruthenium, copper, nickel, rhenium, cobalt, iron, molybdenum, etc.), phosphides (e.g., copper phosphide, nickel phosphide, tungsten phosphide, cobalt phosphide, molybdenum phosphide, combinations thereof, etc.), promoters (e.g., alkali metals, precious metals, bimetallics, etc.) and/or other suitable catalyst materials (e.g., for a specific reaction, combined with a specific substrate material, etc.).

However, the catalytic element 140 may be otherwise configured.

The system can optionally include a joint 160, which functions to connect the electrical coupler to the catalytic element. Examples of a joint can include adhesive, mechanical components (e.g. clamps, screws, etc.), integrated bonding layers, chemical bonds, and/or any suitable mechanism. In variants, the electrical couple and catalytic element can be manufactured as a single component and may not utilize a joint. However, the joint may be otherwise configured.

The power source 200 functions to supply a current for resistively heating the catalytic element. The power source 200 can include a DC or AC power supply, a battery system, a capacitive discharge unit, or any other suitable components. However, the power source 200 may be otherwise configured.

The electrical lead 300 functions to carry current from the power source to the reaction module and to define a current path (e.g., between a power supply or manifolds connecting to a power supply and the reaction module). The electrical lead 300 can function to dissipate heat to prevent thermal stresses by providing a thermal conduction path. The electrical lead 300 can include a set of conductive members (e.g., wires, rods, beams, bars, busbars, etc.) and joints (e.g. connection points, junctions, bonds, fasteners, couplings, etc.). The electrical lead 300 can be in electrical connection with the power source S200. The electrical lead 200 can be made of metal and/or any other conductive material. For example, the electrical lead 200 can be made of copper, steel, aluminum, nickel, stainless steel, tungsten, molybdenum, tantalum, platinum, chromium, iron, carbon, silicon carbide, any composites or alloy thereof, and/or any other suitable materials. Components of the electrical lead 200 can optionally have coatings that can function to protect against corrosion and/or degradation, withstand extreme temperatures, and/or enhance electrical conductivity. For example, the coatings can include carbides (e.g., silicon carbide, etc.), silicides, borides, ceramic coatings, high temperature coatings, conductive coatings, metallic coatings, silver pastes, and/or any suitable coating.

However, the electrical lead 300 may be otherwise configured.

The sensor 400 functions to measure signals of the thermal reactor. The sensor 400 can be positioned throughout the thermal reactor. For example, sensors can be positioned in the catalytic element, at the joint between the catalytic element and the electrical coupler, at the electrical coupler, at the electrical leads, at the beginning and/or end of an electrical circuit of the thermal reactor, in the reaction module, and/or any other locations within the thermal reactor. Sensors can be positioned at specific locations to determine degradation of certain components or joints. Types of sensors can include voltage sensors (e.g., differential voltage probes, instrumentation amplifiers, voltage divider circuit, etc.), current sensors (e.g., hall effect sensor, etc.), VI probes, resistance sensors (e.g. multimeter, ohmmeter, 2-wire resistance measurement, 4-wire Kelvin sensing, etc.), thermocouples, thermistors, chemical composition sensors (e.g., NDIR gas analyzers, electrochemical gas sensors, etc.), pressure sensors (e.g., piezoelectric pressure transducer, strain gauge pressure sensor, MEMs pressure sensors, differential pressure sensors, etc.), flow rate sensors (e.g., thermal mass flow meter, Coriolis flow peter, ultrasonic flow meter, rotameter, MEMs flow sensor, etc.), and/or any other sensors. In variants, the thermal reactor can include sensors for impedance spectroscopy. However, the thermal reactor can have any other suitable sensors.

The computing system 500 functions to process signals, store data, control system, and/or any other suitable processing operations. The computing system 500 can include a processor (e.g., process signals, compute thermal reactor states, determine operation setpoints, etc.), memory (e.g. to store baseline signal curves, algorithms, machine learning models, etc.), a controller (e.g. to control the thermal reactor). However, the computing system 500 can have any other suitable components. However, the computing system 500 may be otherwise configured.

All references cited herein are incorporated by reference in their entirety, except to the extent that the incorporated material is inconsistent with the express disclosure herein, in which case the language in this disclosure controls.

Different subsystems and/or modules discussed above can be operated and controlled by the same or different entities. In the latter variants, different subsystems can communicate via: APIs (e.g., using API requests and responses, API keys, etc.), requests, and/or other communication channels. Communications between systems can be encrypted (e.g., using symmetric or asymmetric keys), signed, and/or otherwise authenticated or authorized.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As used herein, "substantially" or other words of approximation (e.g., "about," "approximately," etc.) can be within a predetermined error threshold or tolerance of a metric, component, or other reference (e.g., within 0.001%, 0.01%, 0.1%, 1%, 5%, 10%, 20%, 30% of a reference), or be otherwise interpreted.

As a person skilled in the art will recognize from the previous detailed description and from the figures and claims, modifications and changes can be made to the preferred embodiments of the invention without departing from the scope of this invention defined in the following claims.

We claim:

1. A method for controlling an electrified reactor comprising:

receiving a baseline resistance relationship associated with a catalytic element of the electrified reactor, wherein the catalytic element comprises porous silicon carbide;

operating the electrified reactor, comprising controlling a power source of the electrified reactor to resistively heat the catalytic element using a predetermined current density and introducing gaseous $CO_2$ and water to the catalytic element, wherein the $CO_2$ and water are converted to CO and $H_2$;

while operating the electrified reactor, measuring at least one of voltage or power of the electrified reactor;

computing an instantaneous resistance of the catalytic element from the current density and the at least one of voltage or power; and controlling the power source based on a difference between a target resistance and the instantaneous resistance, wherein the target resistance is determined based on a baseline resistance relationship, wherein the baseline resistance relationship comprises a resistance-time relationship, wherein the target resistance comprises a steady-state resistance value based on the resistance-time relationship, wherein the resistance-time relationship comprises a resistance versus time curve measured for a test catalytic element under a set of conditions that correspond with a set of reactor operation conditions; wherein, while operating the electrified reactor, a temperature of the catalytic element is not directly measured using a temperature sensor.

2. The method of claim 1, further comprising detecting degradation of the catalytic element, wherein the degradation is detected when the resistance is different from the target resistance by a percent error of at least 10%.

3. The method of claim 1, wherein the baseline resistance relationship further comprises a resistance-temperature relationship; wherein controlling the power source is further based on a resistance value associated with an expected reaction temperature based on the baseline resistance-temperature relationship.

4. The method of claim 1, further comprising measuring the baseline resistance relationship, wherein measuring the baseline resistance comprises:

heating a set of catalytic elements, each analogous to the catalytic element in a furnace;

introducing steam, carbon dioxide, carbon monoxide, and hydrogen to the furnace to mimic reaction conditions of the electrified reactor; and measuring a resistance at different temperatures for each catalytic element of the set of catalytic elements.

5. The method of claim 1, further comprising determining an operation setpoint based on the resistance and the target resistance; wherein the operation setpoint is determined using a set of predetermined heuristics.

6. The method of claim 1, further comprising determining an operation setpoint based on the resistance and the target resistance; wherein the operation setpoint is determined using a machine learning model.

7. The method of claim 1, wherein the baseline resistance relationship is received from a set of baseline resistance relationships, wherein the baseline resistance relationship is received based on a reaction environment of the electrified reactor or an age of the electrified reactor.

8. The method of claim 1, wherein the electrified reactor comprises a second catalytic element arranged fluidically in series with the catalytic element, wherein the second catalytic element is resistively heated with a second power source, wherein the method further comprises computing an instantaneous resistance of the second catalytic element and controlling the second power source, independently from the power source, based on the instantaneous resistance of the second catalytic element and a second target resistance.

9. The method of claim 1, wherein measuring the at least one of voltage or power comprises measuring a voltage drop across the catalytic element during the conversion of the $CO_2$ and water to CO and $H_2$.

10. The method of claim 1, wherein controlling the power source is further based on a flow rate of at least one of the $CO_2$ or the water, wherein the power source is controlled such that a local temperature of the catalytic element is maintained.

\* \* \* \* \*